United States Patent [19]

Thirode

[11] 4,308,853
[45] Jan. 5, 1982

[54] FORCED HOT AIR ALIMENTARY OVEN

[76] Inventor: Rodger Thirode, 26 rue Erlanger, 75016 Paris, France

[21] Appl. No.: 117,085

[22] Filed: Jan. 31, 1980

[30] Foreign Application Priority Data

Feb. 15, 1979 [FR] France ............................... 79 03824

[51] Int. Cl.³ ............................................. A21B 1/00
[52] U.S. Cl. .............................. 126/21 A; 126/273.5; 219/391
[58] Field of Search .................... 126/21 A, 21 R, 273; 211/133; 219/391

[56] References Cited

U.S. PATENT DOCUMENTS

| | | | |
|---|---|---|---|
| 271,516 | 1/1883 | Reid | 211/133 |
| 1,093,450 | 4/1914 | McLaughlin | 211/133 |
| 3,658,047 | 4/1972 | Happel | 126/21 A |
| 3,861,378 | 1/1975 | Rhoads et al. | 126/21 A |

Primary Examiner—Samuel Scott
Assistant Examiner—Wesley S. Ratliff, Jr.
Attorney, Agent, or Firm—Martin P. Hoffman; Mitchell B. Wasson

[57] ABSTRACT

Forced hot air alimentary oven comprises an insulated housing, vertically extending chambers situated at opposite sides of the housing, a plurality of parallel, superposed cooking compartments extending horizontally across the housing, heating elements, and a motor-driven fan for forcing the heated air throughout the housing. Relatively long and narrow passageways are defined between the open upper end of each compartment and the base of the compartment located thereabove. Pairs of spaced lips at opposite ends of each passageway act as entrance, and exit, apertures for facilitating communication between the chambers and the cooking compartments. The lips create a stream, or first zone, of rapidly moving laminarly flowing heated air that heats the food products in the superior compartment; a second, larger zone of slower moving air is utilized to heat the food products in the lower compartment. The two zoned hot air flow cooks foods with differing moisture content, such as fruit pies, evenly and thoroughly.

The heated air can be circulated uniformly throughout the oven from left to right, or vice versa, by adjusting an inverter operatively associated with the fan. Also, the speed at which the hot air is forced through the oven can be adjusted in different ways, i.e., varying the fan speed, regulating a shutter, or regulating a by-pass mechanism, so that the hot air can properly cook a variety of items placed in the compartments.

4 Claims, 5 Drawing Figures

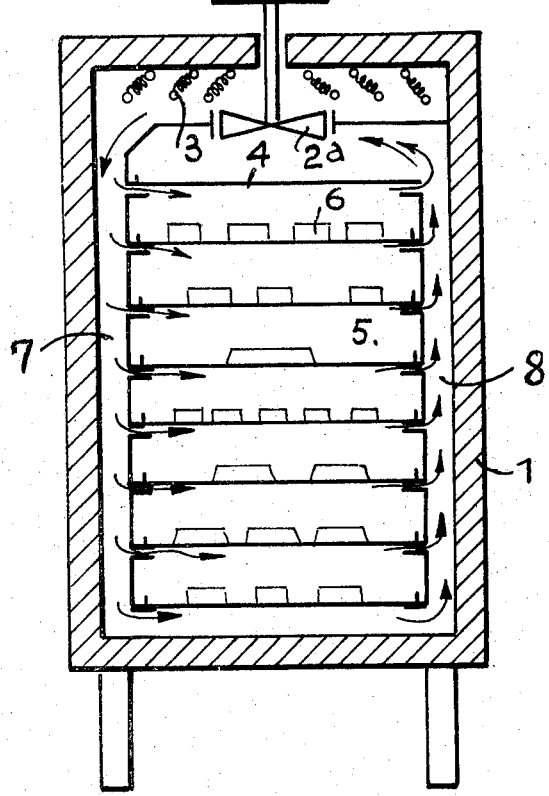
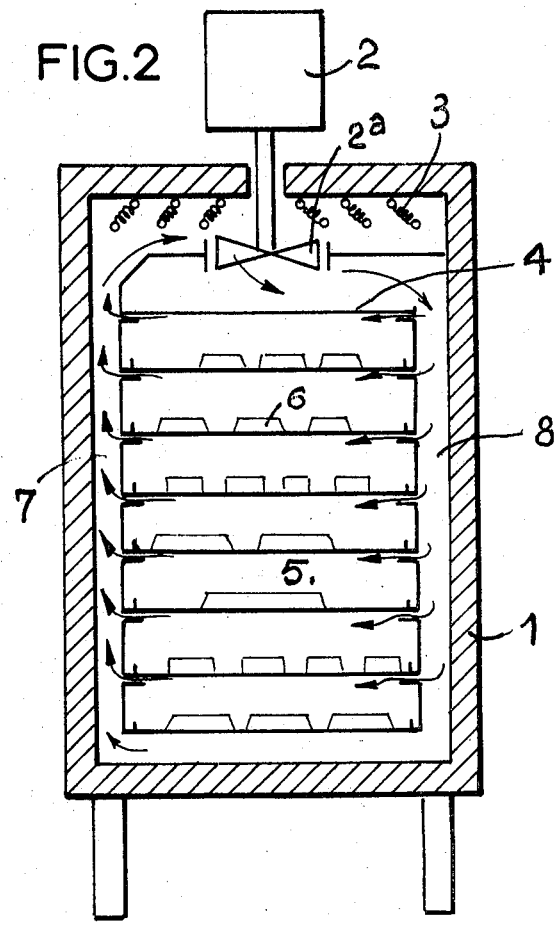
FIG.1
FIG.2

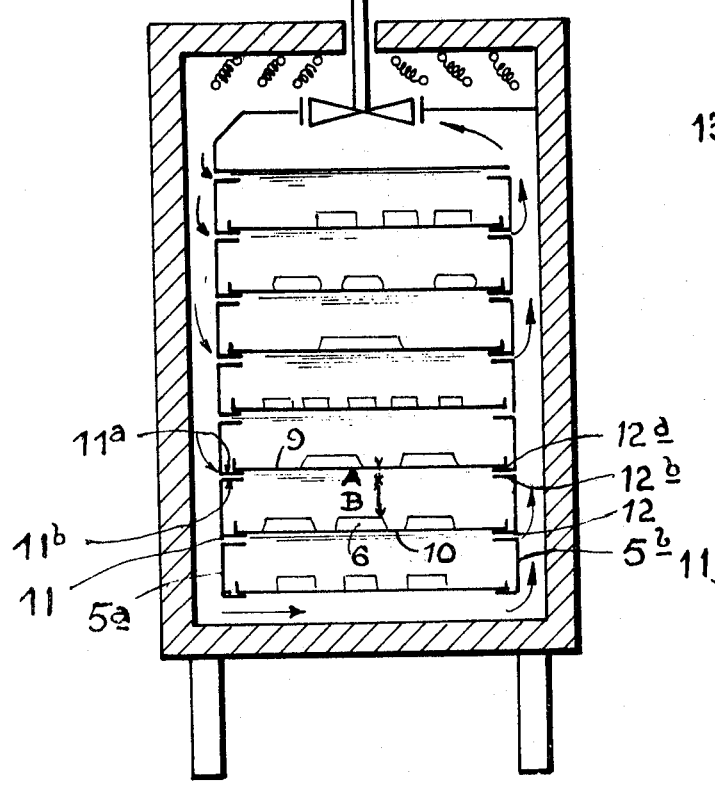
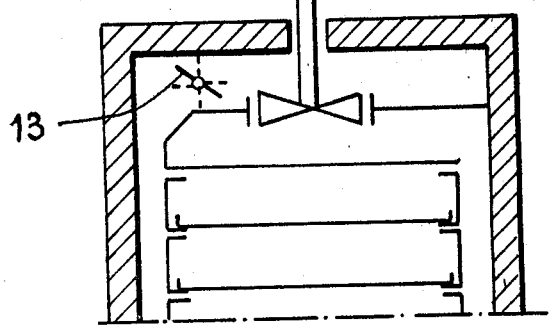
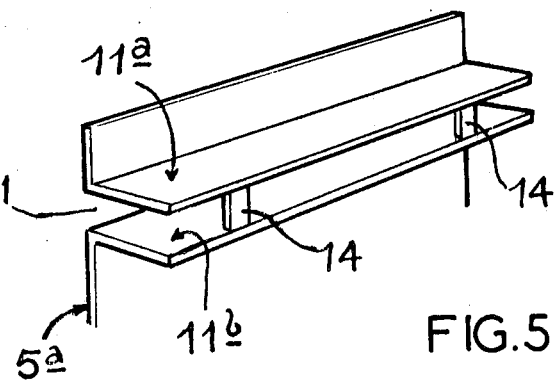

FORCED HOT AIR ALIMENTARY OVEN

BACKGROUND OF THE INVENTION (a) Field of the invention

This invention pertains generally to forced, hot air ovens, and more specifically to structural improvements in such ovens, and the method of operating same, for circulating the heated air more efficiently for even, thorough cooking of diverse products.

(b) Prior Art

French Pat. No. 1,195,023, and its related patent of addition 75,239, disclose an alimentary food oven employing a motor driven fan, or blower, at the rear of the housing to push hot air horizontally from each side of the cooking compartment. The hot air travels across the cooking compartment and passes around the products to be cooked. In the patent of addition, openings are provided in the lateral walls of the cooking compartment to shorten the path of travel for the hot air and thus to improve the cooking process.

French Pat. No. 2,036,225, granted to the same inventor, suggests positioning a screen above the products being cooked in such a way that the food products are totally isolated from direct contact with the currents of hot air. The products are placed in cooking compartments with trays positioned above and below. The hot air is circulated in such a manner that the food products are heated solely through the trays.

In the above noted patents, as well as in other known forced hot air alimentary ovens, considerable difficulty has been encountered in evenly distributing the hot air forced throughout the oven so that the products are cooked thoroughly. In some instances, diffusion screens, movable partitions, etc., have been used to overcome the major problem, but with limited success. The problem of evenly distributing the hot air forced throughout the oven becomes more troublesome when the products to be cooked are dishes containing fruits and creams with high moisture content.

Also, some forced hot air ovens have employed a fan or blower at the rear of the oven housing to force the heated air therethrough. However, such positioning of the fan takes up a relatively large proportion of the oven floor space, thus reducing the cooking capacity. In an attempt to more fully utilize the floor space of the oven, other forced hot air ovens have placed the fan or blower at the top of the oven.

The top mounted fan forces the air towards the bottom of the oven, from whence it rises, enters the cooking compartments through appropriately sized, lateral apertures, and passes across the products to be cooked. However, difficulties have been encountered in the return path for the hot air and uneven cooking of the products has occured.

SUMMARY OF THE INVENTION

With the shortcomings of known forced hot air alimentary ovens clearly in mind, the present invention envisions an oven with a fan or blower positioned on the top of the oven to enhance its capacity, and with a horizontal path for hot air movement through the oven to achieve more uniform cooking within each cooking compartment.

The present forced hot air oven can cook a wide variety of food products thoroughly and efficiently, even products with a high level of moisture. Furthermore, the rate of cooking the food products can be varied precisely and simply, without manipulating removable trays, diffuser screens, partitions and the like usually disposed within known ovens for such purposes.

The present alimentary oven is characterized, inter alia, by passageways that extend horizontally across the upper, open end of each one of the plurality of parallel, superposed cooking compartments. Each passageway guides the hot air across the bottom surface of the base of the adjacent, immediately superior cooking compartment. Pairs of spaced lips define entrance, and exit, apertures at opposite ends of the passageways. Since the entrance and exit apertures are identical, hot air can be forced therethrough in either direction by adjusting an inverter operatively associated with the fan or blower.

The forced hot air moving transversely and horizontally through each passageway is divided into two zones of superposed heating. The first, or upper zone, is a laminar stream of rapidly moving hot air that adheres to the bottom surface of the base of the adjacent, superior cooking compartment for cooking at high temperatures. The second, or lower zone, is an area of slowly diffusing heated air that cooks the top of products retained in a lower cooking compartment. The lower zone includes turbulent secondary currents that break away from the horizontally moving stream that forms the first zone.

Distinct roles in the cooking process are assigned to the two zones of the forced hot air current. The bottom halves of the food products are cooked by the rapidly moving stream of hot air in the upper zone of the adjacent passageway, while the upper halves of the food products are cooked by the secondary currents in the lower zone of each passageway. The combined effect of this two zoned hot air flow is to cook the food products evenly and thoroughly.

For maximum effectiveness, the entrance and exit apertures communicating with each passageway should be approximately one-tenth the vertical distance between the bases of adjacent cooking compartments. Also, vertical braces are provided between the horizontally extending pairs of lips that define the entrance, and exit, apertures communicating with the channel. Such braces prevent deformation of the lips under the stresses induced by the forced hot air traveling thereover, while the lips guide a stream of hot air against the base of the cooking compartment that serves as a ceiling for each passageway.

From the preceding explanation, it is readily apparent that the forced hot air oven thoroughly and completely cooks the food products in each cooking compartment through the combined effect of the main laminar current of hot air and the less dominant, secondary currents of hot air peeling away from the principal, horizontal curtain. Also, the extent of the heating of the products is precisely controlled without resorting to the positioning of movable partitions, diffusers, screens and the like within the oven.

Numerous other advantages attributable to the configuration of the present forced hot air oven will occur to the skilled artisan, when the appended drawings are construed in harmony with the specification.

DESCRIPTION OF THE DRAWINGS

FIG. 1 is a vertical, cross-sectional view through a schematic representation of an oven constructed in accordance with the principles of the invention; the directional arrows show the hot air circulating from left to right through the oven;

FIG. 2 is a view identical to FIG. 1; however, the directional arrows show the hot air circulating from right to left through the oven;

FIG. 3 is a view identical to FIG. 1; however, the two zones of superposed heat are shown with clarity;

FIG. 4 is a schematic view of the upper half of the oven showing the adjustable shutter that regulates the speed of the circulation of hot air; and FIG. 5 is a perspective view of a pair of spaced lips that define an entrance, or exit, aperture for each passageway.

DESCRIPTION OF THE INVENTION

Turning now to FIGS. 1-2 of the drawings, an oven constructed in accordance with the principles of this invention includes a rectangular, insulated housing 1. A motor 2 is situated atop of the housing, and drives blades 2a. The motor and the blades may be considered to be a fan or blower. Heating coils 3 are disposed at the top of the interior of the housing, and an upper wall 4 extends horizontally across the interior of the housing.

A plurality of superposed, parallel cooking compartments 5 extend horizontally across the interior of the housing, and the food products 6 to be cooked are placed within the compartments 5. Vertical chambers 7, 8 are situated on opposite sides of the compartments and communicate therewith. FIG. 1 shows the flow of hot air being forced from left to right through all of the cooking compartments, while FIG. 2 shows the flow of hot air being forced in the opposite direction. Thus, in FIG. 1, chamber 7 admits the hot air and chamber 8 recaptures, or exhausts, same, while in FIG. 2, chamber 8 admits the hot air and chamber 7 recaptures, or exhausts, same.

FIG. 3 shows the spaced base walls 9, 10 that define the vertical dimension of each cooking compartment 5. The horizontal dimension of each cooking compartment is defined by spaced sidewalls 5a, 5b. The upper end of each cooking compartment is open for communication with the vertically extending chambers 7, 8. Aperture 11 admits hot air from chamber 7 into each compartment 5, while aperture 12 serves as an exit for the hot air traveling from compartment 5 into chamber 8. Since the apertures 11, 12 are identical, their roles can be reversed to accommodate a flow of hot air in either direction. The apertures are relatively long and thin and of rectangular shape.

As suggested by FIG. 3, each aperture 11 opens inwardly into communication with a cooking compartment 5. The aperture 11 is defined by a pair of spaced, inwardly projecting lips 11a, 11b; similarly, the aperture 12 is defined by a pair of spaced, inwardly projecting lips 12a, 12b. The sidewalls 5a, 5b are relatively large in comparison to the size of each aperture 11, 12. For example, if walls 9, 10 are spaced 10 centimeters apart, the sidewalls 5a, 5b would be 9 centimeters in height, and each aperture would be only 1 centimeter in height.

The horizontal space between base walls 9, 10 of the adjacent cooking compartments is divided, in effect, into a smaller zone A and a larger zone B. Zone A extends approximately between the inlet and outlet apertures 11, 12 for each cooking compartment, and Zone A coincides with a laminar stream of heated air that passes rapidly across the open, upper end of the cooking compartment. Since the heated air adheres closely to the lower surface of base wall 9, the thermal energy in Zone A passes through the wall 9 and cooks the lower portion of the food products positioned atop to base wall 9. Zone B, which encompasses almost all of the interior of each cooking compartment, receives the secondary currents that break away from the laminar stream of hot air in Zone A. The secondary currents move through the cooking compartments and heat the upper portion of the food products 6 resting on base wall 10.

The greater the speed of travel of the hot air stream moving in Zone A, the greater the tendency of such stream to move in a laminar fashion and adhere to the underside of base wall 9. Obviously, as the laminar flow increases the opportunity for secondary flow of heated air into compartment 5 is diminshed. Conversely, the slower the speed of the flow of hot air in Zone A, the greater the opportunity for diffusion of secondary currents into Zone B. The oven can thus effectively cook a wide variety of food products, with differing amounts of moisture contained therein, simply by adjusting the speed at which the hot air is forced through the housing. Such speed adjustment can be achieved in diverse ways; one illustrative way is suggested by the adjustable shutter 13 shown in FIG. 4.

FIG. 5 shows the structural details of the lips 11a, 11b that define the aperture 11. Braces 14 of reduced width extend between the lips to prevent the hot air forced thereover from distorting the lips. Such distortion, if it occurred, would disturb the laminated stream of hot air passing through Zone A.

The foregoing specification describes an oven wherein (1) the flow path through each cooking compartment is of the same length, (2) the diffusion of the hot air onto the products to be cooked is related to the size and shape of the entrance, and exit, apertures, and (3) the air travels through all of the passageways at the same speed.

By virtue of these factors, one can modify, revise or alter the conditions for cooking over wide ranges to select optimum conditions for thoroughly and uniformly cooking diverse food products.

It will be obvious to those skilled in the art to which this invention appertains that various modifications and revisions could be achieved, without departing from the spirit of the invention. For example, the lower apertures 11, 12 of the oven can be slightly larger than the higher apertures. Also, the motor for the fan may be a variable speed motor, so that the speed of travel of the hot air forced through the housing is adjustable over a wide range. Consequently, the appended claims should not be limited to their literal terms, but should be broadly construed in a fashion consistent with the scope of this significant invention.

I claim:

1. A forced, hot air alimentary oven adapted to cook food products containing components with different moisture contents, such oven comprising:

(a) an insulated housing (1), (b) heating means (3) for elevating the temperature of the air within the housing, (c) vertically extending chambers (7,8) situated at opposite sides of said housing, (d) a plurality of parallel, superposed cooking compartments (5) extending horizontally across said housing between said chambers, (e) each cooking compartment comprising a pair of spaced sidewalls (5a, 5b) and a base wall (9 or 10) extending horizontally between said sidewalls to define an upwardly opening compartment, said base wall being adapted to receive thereon food products to be cooked, (f) a plurality of passageways for communicating with said chambers, each passageway extending horizontally across the open upon end of a cooking compartment, (g) means (2, 2a) for forcing the air heated by said heating means through said chambers and said passageways in sufficient volume and at sufficient speed to cook the food products, the improvement comprising:

(1) a pair of spaced lips (11a, 11b) extending a short distance into each of said passageways to serve as an entranceway between a chamber and a cooking compartment, (2) said lips creating a zone (A) of high speed, laminar flow of heated air that is defined on one side by the base wall of the superior cooking compartment, (3) whereby the heated air transfers the bulk of its heat energy through the base wall of the superior cooking compartment to the bottom of the food products received thereon and the lower cooking compartment receives only the lesser amount of heat energy present in the secondary air currents (zone B) that break away from the zone of high speed, laminar flow of heated air.

2. The improvement in a forced, hot air alimentary oven as defined in claim 1 further comprising a second pair of spaced lips (12a, 12b) extending a short distance into each of said passageways to serve as an exit between a cooking compartment and a chamber, each of said second pairs of spaced lips being horizontally aligned with said first pairs of spaced lips.

3. The improvement in a forced, hot air alimentary oven as defined in claim 1 further comprising vertically extending, narrow braces (14) for reinforcing the spaced lips against thermal deformation as the heated air travels thereover.

4. The improvement in a forced, hot air alimentary oven as defined in claim 1 wherein the vertical distance between said spaced lips is approximately one-tenth the vertical dimension of the sidewalls that form each cooking compartment.

* * * * *